Figure 1:
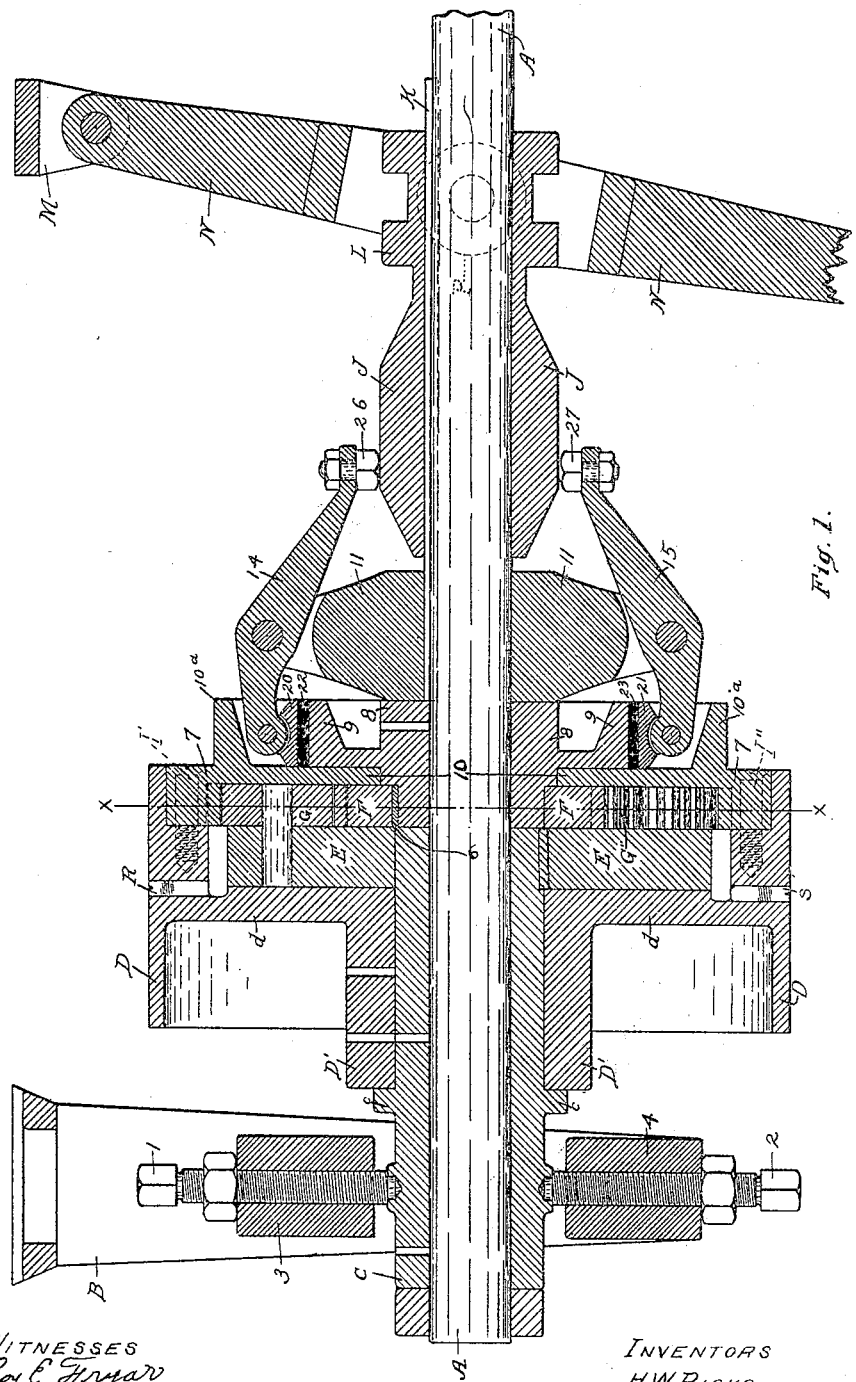

No. 808,309. PATENTED DEC. 26, 1905.
H. W. RICKS & G. W. STIFEL.
REVERSIBLE PULLEY MECHANISM.
APPLICATION FILED JULY 15, 1904.

3 SHEETS—SHEET 1.

WITNESSES
Roy E. Fryar
N. E. Randle

INVENTORS
H. W. Ricks
G. W. Stifel
By their attorney
Robert W. Randle.

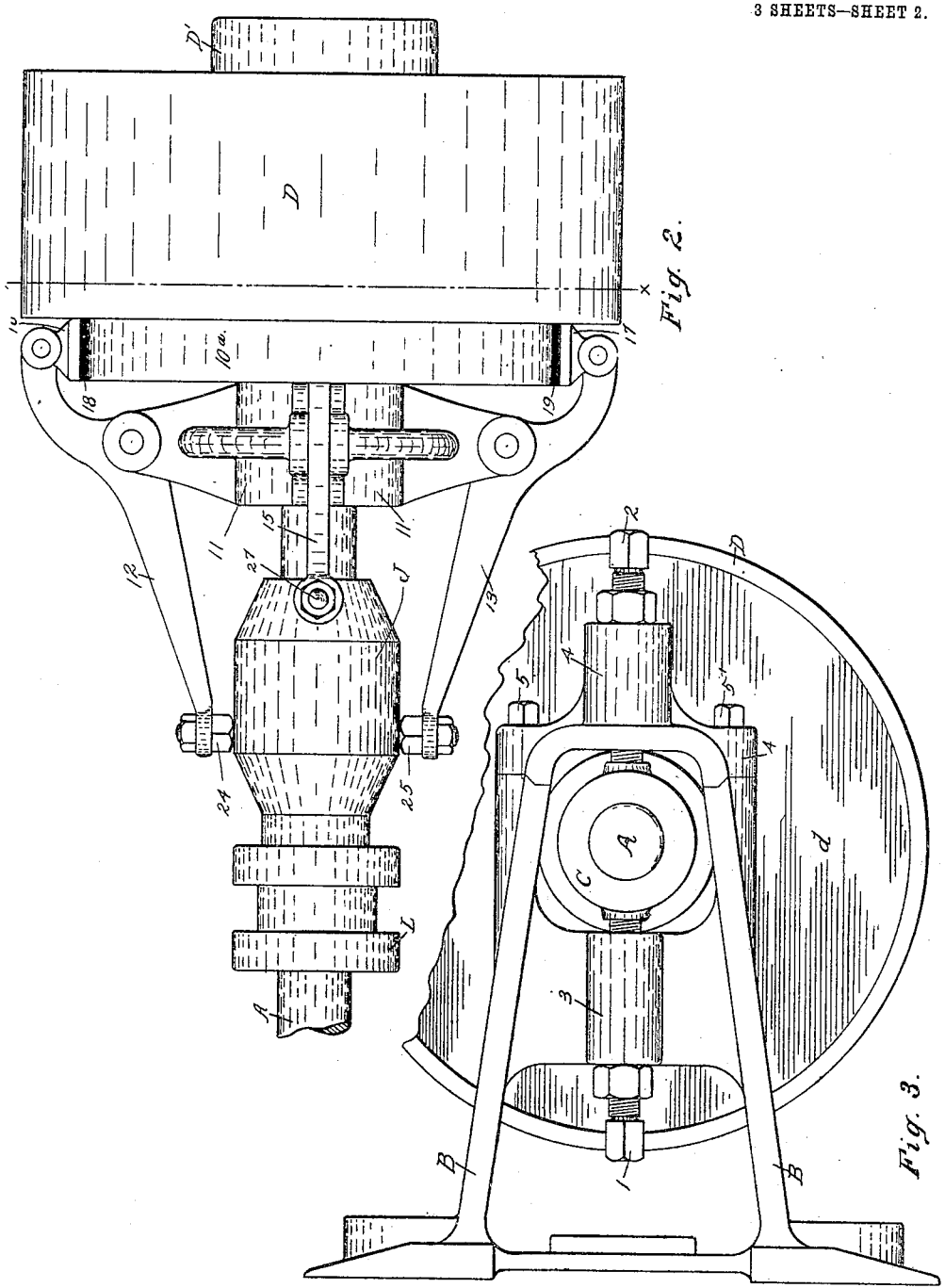

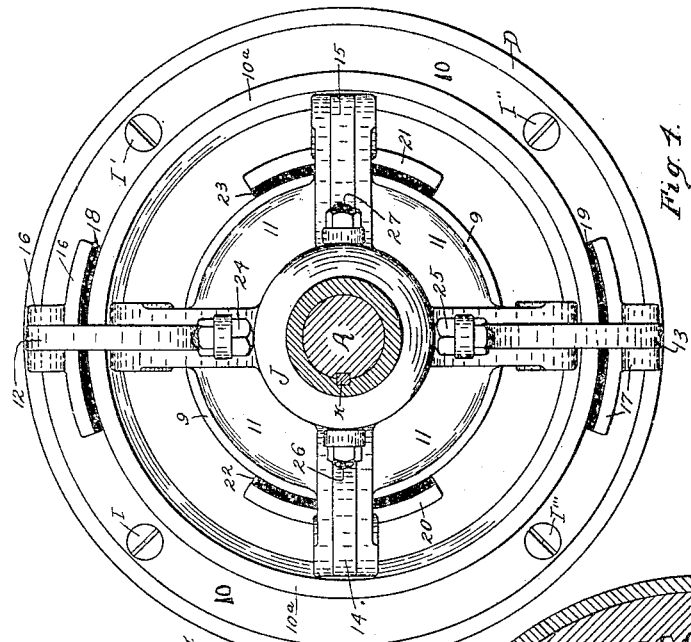
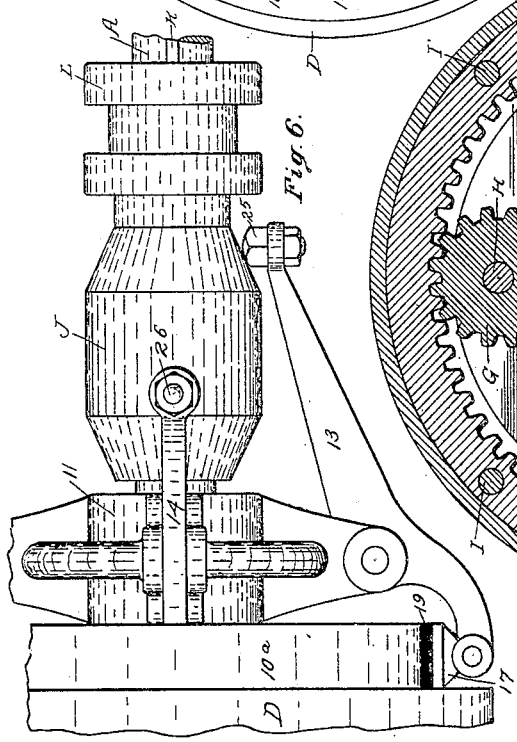
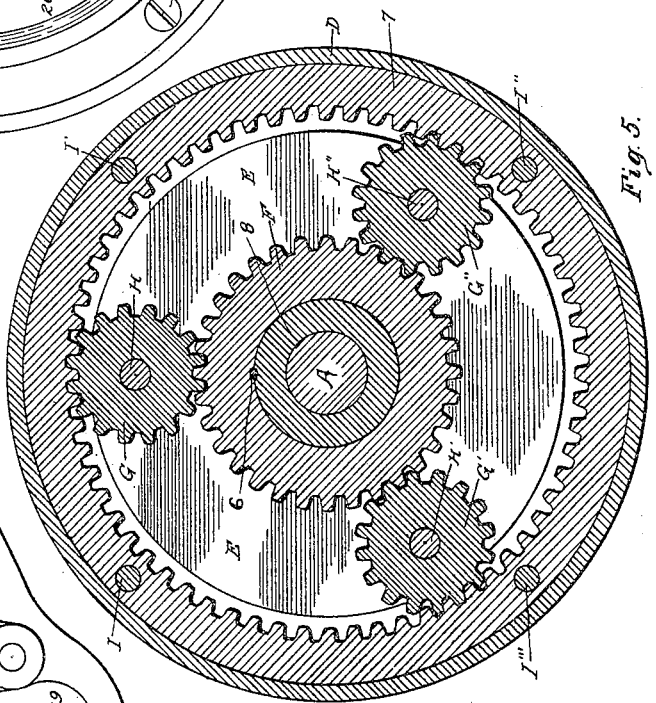

UNITED STATES PATENT OFFICE.

HARRY WALLACE RICKS AND GEORGE W. STIFEL, OF CAMBRIDGE CITY, INDIANA, ASSIGNORS OF ONE-THIRD TO JACOB E. DRISCHEL, OF CAMBRIDGE CITY, INDIANA.

REVERSIBLE-PULLEY MECHANISM.

No. 808,309.  Specification of Letters Patent.  Patented Dec. 26, 1905.

Application filed July 15, 1904. Serial No. 216,665.

*To all whom it may concern:*

Be it known that we, HARRY WALLACE RICKS and GEORGE W. STIFEL, citizens of the United States, residing in Cambridge City, in the county of Wayne and State of Indiana, have invented certain new and useful Improvements in Reversible-Pulley Mechanisms, of which the following is a lucid specification, such as will enable others skilled in the art to which the invention relates to make and use the same.

Our present invention relates to a device operative from a single source of power, as an engine, whereby the machinery operative thereby may be actuated forward or backward and at different rates of speed without changing the speed and direction of the motive power.

Our invention is intended, primarily, to be used in connection with line-shafts or the like, in which the pulley revolves continually at a uniform rate of speed, and our invention incorporates the instrumentalities for quickly reversing the direction of the line-shaft and for changing the speed thereof at the will of the operator.

The essence of this invention is expressed by a combination of two like elements designed to rotate directionally alike or different, or at the same or different speeds, upon a shaft, which shaft may be the actuating or actuated element, in which the actuating element is adapted to move at a constant speed which may be differentiated by the desired ratio, as one to one, one to two, or otherwise, in an ascending or descending scale to meet varying conditions.

The object of this our invention, broadly speaking, is the provision of a reversible-pulley mechanism of simple construction containing a minimum of mechanical parts geared to provide a maximum of efficiency with a minimum of power applied.

Another object is to provide a pulley mechanism by the interposition of which a shaft may be driven revolubly in a direct or reverse direction and at different rates of speed.

Another object is to produce a pulley mechanism by the interposition of which a pulley revolving continuously in one direction may have its power applied to operate other machinery either forward or backward and at different rates of speed without changing the direction or speed of the pulley.

Another object is to provide a pulley mechanism by which the motive power may be allowed to run free and without load, as in starting, by which the load may be applied gradually to operate either forward or backward and to operate at different rates of speed; and, finally, another object is to provide a self-contained interdependent reversible-pulley mechanism which will be simple in character, compact in form and construction, easily operated and maintained, by the employment of which the various objects stated may be attained with certainty and precision, and at the same time to provide a new article of manufacture which can be made and sold at a comparatively low price.

This invention consists in the features of construction, the combination of elements, and the principles of mechanics involved, which will be hereinafter fully set forth, and in the novel features which will be set forth in the claims hereunto appended.

In the accompanying drawings we have shown the employment of a reversible-pulley mechanism incorporating the essential principles of our invention, showing our preferred construction for carrying out the various details in a practical and mechanical sequence.

Referring now to the different views of the drawings by reference characters, Figure 1 is a longitudinal sectional view of our entire mechanism. Fig. 2 is a side elevation of our invention. Fig. 3 is an end elevation of one of the hangers and the pulley as taken from the left toward the right as in Fig. 1. Fig. 4 is an end view of the pulley as taken from the right toward the left as in Fig. 1. Fig. 5 is a cross-sectional view of the pulley proper, taken on the line X X of Figs. 1 and 2; and Fig. 6 is a detail view showing the clutching mechanism reversed from that in Fig. 1 and on a quarter-turn from that shown in Figs. 1 and 2.

Similar characters denote and refer to similar parts throughout the several views of the drawings.

For a fuller comprehension we will now take up a detail description of our invention and its operation and will refer to the various parts as briefly and compactly as we may.

In the drawings, the letter A denotes the main shaft, on which our invention is mounted and which is revoluble in either direction by the construction we will presently describe and claim.

It will be understood that the shaft A is to be supported by two or more hangers B, substantially as shown in Figs. 1 and 3. In the lower converging parts of the hangers is secured the spindle C, which is permanently securable in horizontal position by the oppositely-disposed set-screws 1 and 2 above and below, respectively, the former being threaded in the web 3 of the hanger and the latter in the cap 4 of the hanger, the said cap being secured by the machine-screws 5 and 5′. Said spindle C has an aperture formed longitudinally therethrough to receive the shaft A revolubly therethrough, as shown. Extending out from and around the spindle C is a flange $c$, integral therewith.

The letter D denotes the pulley-rim, having a central web $d$, which connects the rim integrally to its hub D′, which hub is revolubly mounted on the spindle C with its outer end contacting with the flange $c$, as shown.

By the above it will be seen that the pulley proper is revolubly mounted around but independent of and concentric with the said shaft A.

Permanently secured to the inner end of the spindle C is the disk E, which contacts with the inner face of the web $d$ and of a diameter almost the same as the inner diameter of the right-hand interior portion of the flange of the pulley-rim and substantially half the thickness of the depth thereof.

The numeral 8 denotes a sleeve mounted revolubly around the shaft A with its adjoining portion of same size and contacted with the end of the spindle C to receive thereon the center pinion F, which latter is secured to the sleeve 8 by the key 6.

The interior right-hand portion of the rim D incloses an internal spur-gear 7, formed on the plate 10, as is shown in Fig. 5, corresponding to and concentric with and opposite to, but some distance from, the center pinion F. Said spur-gear 7 and the pinion F are connected by three (more or less) idle pinions, as G, G′, and G″, which are each mounted on its respective axle or shaft H, H′ and H″, which axles extend out from the face of the disk E. The sleeve 8 is provided with a web at right angles to the shaft A, which web carries a circular friction-wheel 9, whose face is formed parallel and concentric with the shaft A. By the above it will be apparent that should the pulley D be revolved the friction-wheel 9 will revolve in a direction opposite thereto at all times.

Mounted on the sleeve 8 between the friction-wheel 9 and the faces of the pinions F, H, H′, and H″ is the plate 10, secured by screws, as I, I′, I″, and I‴, to the pulley D. Extending from the face of the plate 10 in an axial direction is a friction-flange $10^a$, which corresponds in contour to the friction-wheel 9, but is of greater diameter and is located some distance therefrom, as shown in Fig. 1.

From the above it will be seen that should the pulley D be revolved the friction-flange $10^a$ will be revolved therewith in same direction.

At this point it should be understood that it is intended that the pulley D should be revolved continuously in one direction, in which case the friction-flange $10^a$ will be carried therewith, and the friction-wheel 9 will at all times be revolving in a direction opposite thereto, the shaft at this point being stationary and unaffected by the movement of the pulley. Our object now is to provide expeditious and simple means for connecting the shaft A to one or the other of said oppositely-revolving elements to be revolved thereby at the will of the attendant.

Permanently keyed to the shaft A adjoining the outer face of the sleeve 8 is the four-arm hanger 11, having two pairs of arms spaced equally apart on the quarter, with the members of each pair oppositely disposed, and in the infurcation of each arm is fulcrumed a lever, 12 and 13 being the long levers and 14 and 15 the short levers. The long levers 12 and 13 terminate slightly over the face of the friction-flange $10^a$, with a shoe 16 and 17, respectively, pivoted to their ends, whose faces are adapted to contact with the face of the said friction-flange $10^a$, their contact-faces being preferably reinforced by a frictional member 18 and 19, respectively, formed of leather or the like. The short levers 14 and 15 terminate slightly over the face of the friction-wheel 9, with a shoe 20 and 21, respectively, pivoted to their ends, whose faces are adapted to contact with the face of the friction-wheel 9, the contact-faces being preferably reinforced by a friction member 22 and 23, respectively, formed of leather or the like.

Mounted on the shaft A is the cone J, carried revolubly therewith by means of the spline K and slidable endwise on the shaft, and its inner end is adapted to contact with the arm-hanger 11 and also is movable therefrom. The cone J has a central swell portion which is parallel with the shaft A, with beveled or truncated edges inclining down therefrom to near the line of the shaft. The outer end of the arms 12 and 13 are each provided with a smooth round head adjustable detent 24 and 25, respectively, whose rounded portions are adapted to travel on the periphery of the cone J, and likewise the end of each of the arms 14 and 15 is provided with a smooth round head adjustable detent 26 and 27, respectively, whose rounded portion is adapted to travel on the periphery of the cone J, the former operating on the outer or right-hand end of the cone, while the latter operates on the inner or left-hand end of the cone. To the outer end of the cone J is integrally connected the channel-wheel L. Secured to some stationary point above the channel-wheel L is the hanger M, and pivoted in its forks is the downwardly-extending lever N. The central portion of the lever N surrounds the channel-wheel without contact therewith, with a roller-bearing P carried on either side thereof and adapted to travel in the channel of the wheel. The lower end of the lever N may be extended downwardly the desired distance to be in easy reach of the operator.

To illustrate the operation, supposing the pulley D to be belted and as traveling at the desired continuous rate of speed, it will be apparent that, as shown in Fig. 1, the shaft will be carried revolubly in the opposite direction by reason of the lever N being located to the left, as shown, causing the outer ends of the arms 14 and 15 to be spread apart, and consequently causing the shoes 20 and 21 to grip on the friction-wheel 9. Should it now be desired to reverse the rotation of the shaft A, then the operator has only to throw the lever N to the right, thus causing the detents 26 and 27 to travel down the left-hand gradient of the cone toward the shaft, thus causing the shoes 20 and 21 to release from the friction-wheel 9, while at the same time the detents 24 and 25 would be forced apart by the right-hand bevel of the cone J, thus causing the shoes 16 and 17 to grip the face of the friction-flange 10ª, as shown in Fig. 2.

We desire it to be understood that the proportionable sizes of the pinions F and G, G, and G'' may be variously changed to accomplish the desired speed of the shaft.

It will be observed that we have made ample provision for lubricating the various parts, particularly the interior of the pulley, to accomplish which the screws R and S may be removed and the lubricant inserted through the apertures occupied thereby, thus allowing the pinions and other interior parts to continuously operate in an oil-bath.

From the above description, when taken in connection with the accompanying drawings, forming a part of this specification, it will be apparent that we have produced an improved construction embodying the objects otherwise referred to herein.

While we have illustrated and described the best means now known to us for carrying out the objects of our invention, we desire it to be understood that we do not restrict ourselves to the exact details of construction shown and described, but hold that any changes or variations therein as would suggest themselves to the ordinary mechanic would clearly fall within the limits and scope of our invention.

The terms "upper," "lower," "right-hand," "left-hand," and other similar terms are used for convenience of description, and it is not intended by the use of such terms to limit the arrangement and operation of the several parts to the relative positions indicated.

Having now fully shown and described our invention and the best means for its construction and operation to us known at this time, what we claim, and desire to secure by Letters Patent of the United States, is—

1. The combination with a shaft, the hangers by which the shaft is mounted, a stationary spindle in which the shaft may revolve in either direction, a pulley mounted revolubly on said spindle concentric with the spindle and the shaft, an internal gear located in the flange of the pulley-rim, a sleeve and a pinion mounted revolubly on the shaft, gear-wheels located within the pulley and meshing with said internal gear and pinion to cause said sleeve to rotate on the shaft in a direction opposite to the direction of the pulley, means for connecting the shaft to revolve with the sleeve, and means for connecting the shaft to revolve with the pulley, substantially as described.

2. In combination with a driven element, a cone mounted around the driven element carried revolubly therewith and movable endwise thereon, a pulley mechanism characterized by a stationary element mounted around the driven element, a continuous rotating actuating element mounted on and concentric with the driven element and the stationary element, gear-wheels carried in the actuating element, a reverse element mounted on the driven element and by said gear-wheels continuously rotated in a direction opposite to the actuating element, coupling elements secured to the driven element, means for frictionally connecting the coupling elements to either the actuating element or to the reverse element by the thrust of said cone in an axial direction at the will of the operator, all substantially as set forth.

3. An actuating-pulley, a driven shaft on which said pulley is mounted to be carried thereby, gear-wheels located in the pulley, a sleeve mounted on the shaft and adapted to be operated by the gear-wheels in a direction opposite to the direction of the pulley, a friction-band carried by the pulley and a smaller friction-band carried by the sleeve, a pair of arms for each friction-band with shoes adapted to clamp thereon, an arm-hanger secured to the driven shaft to which all of said arms are pivoted, a cone carried by the shaft and slidable in an axial direction thereon and providing the means for actuating said arms to cause them to contact their respective shoes with the respective friction-bands in order to operate the shaft in either direction, substantially as described.

4. In a reversible-pulley mechanism, the combination with the hangers and a shaft carried by said hangers, a permanent spindle surrounding the shaft and in which the shaft may revolve, a pulley revolubly mounted on said spindle and concentric with the spindle and the shaft, a plate 10 secured to the pulley having an internal gear and a flange, a disk secured to the inner end of said spindle and inclosed by the pulley-rim, a sleeve rotatably mounted on the shaft adjacent said disk, a central pinion secured around the inner end of the sleeve and contacted by said disk, a plurality of pinions inclosed by said plate mounted on axles secured on said disk and meshing with said central pinion and with the said internal gear, a friction-wheel integral with said sleeve, and means for connecting said shaft to revolve with either the friction-wheel or with the friction-flange, all substantially as shown and described.

5. In a reversible-pulley mechanism, the combination of hangers and a shaft carried by said hangers, a permanent spindle surrounding the shaft and in which the shaft may revolve, a pulley revolubly mounted on said spindle and concentric with the spindle and the shaft, a plate 10 secured to the pulley having an internal gear and a flange, a disk secured to the inner end of said spindle and inclosed by the pulley-rim, a sleeve rotatably mounted on the shaft adjacent to said disk, a central pinion secured around the inner end of the sleeve and contacted by said disk, a plurality of pinions inclosed by said plate mounted on axles secured to said disk and meshing with said central pinion and said internal gear, a friction-wheel integral with said sleeve, a cone carried by the shaft slidable endwise thereon, an arm carried by the shaft between the cone and the friction-wheel, levers pivoted in the arm-hangers, shoes mounted on the inner ends of said levers, one set of levers being adapted to contact their shoes with the friction-flange, and the other levers being adapted to contact their shoes with the friction-wheel when said cone is moved to the left or right, respectively.

In testimony whereof we have hereunto signed our names in the presence of two subscribing witnesses.

HARRY WALLACE RICKS.
GEORGE W. STIFEL.

Witnesses:
J. E. DRISCHEL,
ROBERT W. RANDLE.